(12) United States Patent
Vanderheeren et al.

(10) Patent No.: US 11,916,977 B2
(45) Date of Patent: *Feb. 27, 2024

(54) USER-CENTRIC CONNECTIONS TO A LOCATION COMPRISING DIGITAL COLLABORATION TOOLS

(71) Applicant: BARCO N.V., Kortrijk (BE)

(72) Inventors: Michaël Toon Andre Arthur Vanderheeren, Bissegem (BE); Gauthier Renard, Kuurne (BE); Laurens Cyrille Vandenbroucke, Bredene (BE); Johan Peter Frans Degraef, Ghent (BE)

(73) Assignee: BARCO N.V., Kortrijk (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/051,355

(22) Filed: Oct. 31, 2022

(65) Prior Publication Data

US 2023/0106594 A1  Apr. 6, 2023

Related U.S. Application Data

(63) Continuation of application No. 17/254,320, filed as application No. PCT/EP2019/068030 on Jul. 4, 2019, (Continued)

(51) Int. Cl.
*H04L 12/70* (2013.01)
*H04L 41/0806* (2022.01)
(Continued)

(52) U.S. Cl.
CPC ...... *H04L 65/1069* (2013.01); *H04L 65/1073* (2013.01); *H04L 65/403* (2013.01); (Continued)

(58) Field of Classification Search
CPC ............. H04L 65/1069; H04L 65/1073; H04L 65/403; H04L 67/141; H04L 65/1046; (Continued)

(56) References Cited

U.S. PATENT DOCUMENTS 9,338,400 B1 * 5/2016 Krishnan ............ H04L 12/1822
9,877,266 B1   1/2018 Knas et al.
(Continued)

FOREIGN PATENT DOCUMENTS

WO   2016139289 A1   9/2016

OTHER PUBLICATIONS

Office Action issued in corresponding Chinese Application No. 201980045400.5, dated Aug. 17, 2022, with English machine translation.
(Continued)

*Primary Examiner* — Moustafa M Meky
*Assistant Examiner* — Elizabeth Kassa
(74) *Attorney, Agent, or Firm* — HAMRE, SCHUMANN, MUELLER & LARSON, P.C.

(57) ABSTRACT

A method, device and system for providing user-centric connections to a location comprising digital collaboration tools, as well as software for carrying out the method. The method includes a network device having a beacon system for proximity detection and a BYOD (Bring Your Own Device). A confirmed BYOD proximity can be used to initiate the setup of a data channel between the network device and the BYOD, and further join the BYOD to a UC (Unified Communications systems and tools) session.

19 Claims, 9 Drawing Sheets

Related U.S. Application Data now Pat. No. 11,489,883, which is a continuation-in-part of application No. 16/028,529, filed on Jul. 6, 2018, now Pat. No. 10,999,332.

(51) Int. Cl.

| | |
|---|---|
| *H04W 48/08* | (2009.01) |
| *H04L 67/12* | (2022.01) |
| *H04L 65/1069* | (2022.01) |
| *H04L 65/403* | (2022.01) |
| *H04L 67/141* | (2022.01) |
| *H04W 12/0433* | (2021.01) |
| *H04L 65/1073* | (2022.01) |
| *H04W 12/06* | (2021.01) |
| *H04W 4/02* | (2018.01) |

(52) U.S. Cl.
CPC ......... *H04L 67/141* (2013.01); *H04W 4/023* (2013.01); *H04W 12/0433* (2021.01); *H04W 12/06* (2013.01)

(58) Field of Classification Search
CPC ... H04L 51/36; H04L 63/107; H04L 12/1818; H04W 4/023; H04W 12/0433; H04W 12/06; H04W 12/64; H04W 12/37; H04W 4/80; H04N 7/147; H04M 3/563; H04M 3/567

See application file for complete search history.

(56) References Cited

U.S. PATENT DOCUMENTS

| | | | | |
|---|---|---|---|---|
| 2009/0110167 A1* | 4/2009 | Parker, II | ............... | H04L 51/36 379/201.02 |
| 2009/0110169 A1* | 4/2009 | Whitsell | ............ | H04L 12/1818 379/205.01 |
| 2009/0112926 A1* | 4/2009 | Parker, II | ............... | H04L 12/66 |
| 2009/0112996 A1* | 4/2009 | Baker, III | ............... | H04L 67/14 709/206 |
| 2012/0185291 A1 | 7/2012 | Ramaswamy et al. | | |
| 2014/0064471 A1* | 3/2014 | Krishnan | ............. | H04M 3/567 379/202.01 |
| 2014/0344420 A1* | 11/2014 | Rjeili | ................... | H04L 43/04 709/220 |
| 2015/0050967 A1* | 2/2015 | Bao | ....................... | H04R 3/005 455/570 |
| 2015/0244699 A1* | 8/2015 | Hessler | ................. | G06F 21/44 726/7 |
| 2015/0319178 A1* | 11/2015 | Desai | .................... | G06F 9/452 726/1 |
| 2015/0334511 A1 | 11/2015 | Rivera et al. | | |
| 2017/0006162 A1 | 1/2017 | Bargetzi et al. | | |
| 2017/0099361 A1 | 4/2017 | Digilov et al. | | |
| 2019/0043148 A1* | 2/2019 | Vemury | ........... | G06K 19/06112 |
| 2019/0068734 A1 | 2/2019 | Cutler et al. | | |

OTHER PUBLICATIONS

Office Action issued in corresponding Chinese Application No. 201980045400.5, dated Mar. 11, 2022, with English machine translation.

International Preliminary Report on Patentability in corresponding PCT Application No. PCT/EP2019/068030 dated Jan. 21, 2021.

ISR and Written Opinion in corresponding PCT Application No. PCT/EP2019/068030 dated Nov. 4, 2019.

U.S. Office Action in corresponding U.S. Appl. No. 16/028,529, dated Aug. 6, 2020.

U.S. Advisory Action in corresponding U.S. Appl. No. 16/028,529, dated Nov. 30, 2020.

U.S. Office Action in corresponding U.S. Appl. No. 16/028,529, dated Feb. 5, 2020.

* cited by examiner

USER-CENTRIC CONNECTIONS TO A LOCATION COMPRISING DIGITAL COLLABORATION TOOLS

CROSS-REFERENCE TO RELATED APPLICATIONS

This application is a continuation application of U.S. application Ser. No. 17/254,320, filed Dec. 21, 2020 and granted as U.S. Pat. No. 11,489,883, which is the national stage entry of PCT/EP2019/068030, filed Jul. 4, 2019, which is a continuation-in-part of U.S. application Ser. No. 16/028,529, filed Jul. 6, 2018 and granted as U.S. Pat. No. 10,999,332, which are incorporated by reference.

Methods, devices and a system are described for user-centric connections to a location comprising digital collaboration tools as well as software for carrying out the method.

BACKGROUND

Communication within an enterprise environment (e.g. at companies, education sites, hospitals, entertainment locations, etc.) has changed and is moving away from location-specific behavior where a dedicated local device with a specific phone or video calling number was present. Wireless connections enable an employee to have access to the digital infrastructure almost anywhere within or in proximity of the enterprise building. However, while this technology can offer freedom, many solutions results in a complex user workflow when a user wants to connect to the resources at the present location. In many cases it is required of the user to book a meeting beforehand or to use a meeting room control panel in order to get access to the room resources, or to call a specific meeting room number to get connected.

SUMMARY OF THE INVENTION

The present invention can allow any enterprise room (for meetings, trainings, stage presentations, etc.) to become user centric with preferably very limited action from the user. Communication can be centralized e.g. within standardized Unified Communications (UC) system or tools environments, and using meeting rooms then becomes a different experience. Embodiments of the present invention can provide standardized and unified workflows to a collaboration environment. Hence, embodiments of the present invention may overcome ay least one of the above mentioned deficiencies, For example, a user can walk into a room, be connected and start a UC meeting right from their laptop. Also the users can augment their capabilities with that of the meeting room (e.g. resources such as a room display, camera, microphones, etc.). Thus, a user may use the room display to share locally, and use video and/or audio equipment to enhance communication quality in the meeting. By using embodiments of the present invention, sharing can be implemented both remotely and locally. The experience can be compared to what a user may have at his/her desk, so using room resources may not require any additional training or hurdles. Ultimately the user and his/her guests can enter a UC session in any room without having to follow or change pre-bookings, pre-configurations or other predetermined constraints.

Thus, when a BYOD (Bring Your Own Device) is brought within a beacon system range the detected proximity can trigger an automatic set-up of configuring the room resource to become an extended resource to the user/BYOD or the UC session.

Consequently, the connection to the room resources may also be automatically terminated when there is no more BYOD within the proximity range of the local network device (while the ongoing UC session does not need to be terminated). Hence, the user/BYOD could enter another meeting room and connect ad-hoc to a network device and corresponding room resources of that room. There is no need to pre-allocate rooms or resources or consult a calendar tool to collect information on participants, but the connection authorization is based on that at least one of the BYOD's participating in a UC session, is located within the proximity range of a network device (beacon system).

Devices participating in a meeting can comprise BYODs located in the related meeting room, room resources in the meeting room and remote BYODs connecting via a UC (Unified Communications system or tools) session. There may also be BYODs inside the meeting room that are not connected to the UC session. Embodiments of the present invention allow to synchronize the connectivity status of the UC session between the UC session, a BYOD app and a network device app such that an action executed within the BYOD app can be subsequentially executed within the BYOD UC session. For example, a BYOD operator can request a sharing action by performing an action with the BYOD app (e.g. pushing an icon), the BYOD app can then automatically communicate this request to the UC client and trigger the launch of the sharing action within the UC session.

It is an objective of the present invention to provide a room for meetings, trainings, stage presentations, etc. and a method of operating the room so that collaboration becomes more user centric with preferably very limited action from the user.

This has the advantage of changing the way meeting rooms and meetings are perceived by the users. The collaboration becomes more efficient because the time consuming procedures to join an electronic meeting are reduced.

In one embodiment of the present invention there can be provided a method for joining a network device UC client to a UC session connected to at least one BYOD UC client, the network device and the BYOD each can comprise a beacon transmitter configured to periodically or continuously transmit a beacon signal, or a beacon receiver configured to receive the beacon signal within its range, so that they can exchange the beacon signal, the beacon signal having a range, the network device can comprise an ID, a network device application (app) and a UC client, and the BYOD can comprise a BYOD app and a UC client, the method can comprise the steps of bringing the BYOD and the network device within the beacon signal range so that the BYOD and the network device can exchange a beacon signal comprising the network device ID, and generate and register an authentication-ID key, the exchanged beacon signal can trigger the BYOD app and the network device app to configure a data channel between them, the configured data channel can trigger the BYOD app to check if the BYOD UC client is connected to a UC session, if so, the BYOD app can send an invitation comprising the authentication-ID key to the network device app instructing the UC client to connect to the UC session, the network device app can check if at least one BYOD app that has a configured data channel to the network device app is also in the UC session, if so, the network device app can accept the invitation and instruct the network device UC client to connect to the UC session.

This has the advantage that a BYOD can be joined to a UC session without first starting the UC session or starting a login procedure (possibly on an additional device) but the UC session information transfer is enabled in the connection procedure itself.

Additionally, the method can comprise a second BYOD, the network device and the second BYOD each can comprise a beacon transmitter configured to periodically or continuously transmit a beacon signal, or a beacon receiver configured to receive the beacon signal within its range, so that they can exchange the beacon signal, the beacon signal having a range, the second BYOD can comprise a second BYOD app and a second UC client, the method can further comprise the steps of
bringing the second BYOD and the network device within the beacon signal range so that the second BYOD and the network device can exchange a beacon signal,
the exchanged beacon signal can trigger the second BYOD app and the network device app to configure a data channel between them,
the configured data channel can trigger the second BYOD app to check if the network device UC client is connected to a UC session,
if so, the second BYOD app can instruct the second UC client to connect to the UC session. This has the advantage that a second BYOD user entering a meeting room can automatically be joined by merely walking into the meeting room. The UD session moderator does not need to invite the second person or BYOD.

Additionally, the network device and the BYOD can comprise a second beacon system having a range for proximity detection and comprising a beacon transmitter configured to periodically or continuously transmit a second beacon signal, the method can comprise bringing the network device and the BYOD within the range for proximity detection, the second beacon system can exchange a second beacon signal, which can trigger the transmitter of the first beacon system to periodically or continuously send out a first beacon signal during a limited amount of time or until a data channel has been configured between the network device and the BYOD.

This provides the possibility to not continuously transmit the warble (the first beacon signal).

Additionally, the method can comprise a step of registering a data channel between the BYOD and the network device which can be preceded by the BYOD confirming to connect with the network device.

This makes sure the BYOD connects to the correct network device.

Additionally, the BYOD can comprise an BYOD identity, and the method can comprise a step of registering a data channel, the method can comprise the BYOD app requesting authentication with the network device app for the BYOD identity.

Additionally, the method can comprise step of registering a data channel, the method can comprise the network device computer program product generating and registering an authentication code with the BYOD identity.

Additionally or alternatively, the network device can be connected to a room resource having input and output signals, and the method can comprise the step of the network device app controlling the input and output signals of the room resource.

Additionally or alternatively, the BYOD app can adopt a BYOD app state and the BYOD UC client can adopt a BYOD UC client state, the method can comprise the step of the BYOD app bringing the BYOD UC client state equal to the BYOD app state.

This has the advantage that the BYOD operator may share content via a UC session or via local sharing but the same outcome will be obtained, e.g. that the content is shown on a room display.

Additionally, there can be another BYOD present of a third type, having a BYOD app and no BYOD UC client, the method can comprise when the network device is connected to a UC session, the BYOD app of the another BYOD of the third type can share content to the network device app, the network device app can share the content to the network device UC client which then can share the content in the UC session.

This enables a BYOD having no UC client to still participate in the UC call if the BYOD is located within a meeting room that has a network device connected to the UC session. The content can be shared in the UC session and the UC session can be shared via the room display.

In another embodiment of the present invention there is provided a system for joining a network device UC client to a UC session connected to at least one BYOD UC client, the network device and the BYOD each can comprise a beacon transmitter configured to periodically or continuously transmit a beacon signal, or a beacon receiver configured to receive the beacon signal within its range, so that they can exchange the beacon signal, the beacon signal having a range, the network device can comprise an ID, a network device app and a UC client, and the BYOD comprises a BYOD app and a UC client, if the BYOD and the network device are positioned within the beacon signal range, there can be an exchange of a beacon signal between the network device and the BYOD, wherein the beacon signal can comprise a network device ID and a corresponding authentication-ID for authorizing the BYOD UC client to connect to the UC session.

The system enables a procedure where a BYOD can be joined to a UC session without first starting the UC session or starting a login procedure (perhaps on an additional device) but the UC session information transfer is enabled in the connection procedure itself.

Additionally the system can comprise a second BYOD, the network device and the second BYOD each comprising a beacon transmitter configured to periodically or continuously transmit a beacon signal, or a beacon receiver configured to receive the beacon signal within its range, so that they can exchange the beacon signal, the beacon signal can have a range, the second BYOD can comprise a second BYOD app and a second UC client, the system can be configured to
bring the second BYOD and the network device within the beacon signal range so that the second BYOD and the network device can exchange a beacon signal,
the exchanged beacon signal can trigger the second BYOD app and the network device app to configure a data channel between them,
the configured data channel can trigger the second BYOD app to check if the network device UC client is connected to a UC session,
if so, the second BYOD app can instruct the second UC client to connect to the UC session.

The system can enable a second BYOD user entering a meeting room to automatically be joined by merely walking into the meeting room. The moderator does not need to invite the second person or BYOD.

Additionally, the network device and the BYOD can comprise a second beacon system having a range for proximity detection and comprising a beacon transmitter configured to periodically or continuously transmit a second beacon signal, the method can comprise bringing the network device and the BYOD within the range for proximity detection, the second beacon system can exchange a second beacon signal, which can trigger the transmitter of the first beacon system to periodically or continuously send out a first beacon signal during a limited amount of time or until a data channel has been configured between the network device and the BYOD.

This provides the possibility to not continuously transmit the warble (the first beacon signal).

Additionally, the system can comprise a BYOD confirmation to connect to the network device and a registered data channel between the BYOD and the network device.

Additionally, the system can comprise the BYOD having a BYOD identity, and the system can comprise a registered data channel and a BYOD app request for authentication of the BYOD identity with the network device app.

Additionally, the system can comprise a registered data channel and the network device app can comprise an authentication code with the BYOD identity.

Additionally or alternatively, the system can comprise that the network device can be connected to a room resource having input and output signals which can be controlled by the network device.

Additionally or alternatively, the system can comprise the BYOD app having a BYOD app state and the BYOD UC client having a BYOD UC client state and the system can be configured to have the BYOD app bringing the BYOD UC client state equal to the BYOD app state.

Additionally, the system can comprise another BYOD of a third type having a BYOD app and no BYOD UC client, the system can be configured so that the network device can be connected to a UC session, content of the BYOD app of the another BYOD of the third type can be shared to the network device app, the content can be shared by the network device app to the network device UC client which can share the content in the UC session. The system enables a BYOD having no UC client to still participate in the UC call if the BYOD is located within a meeting room that has a network device connected to the UC session. The content can be shared in the UC session and the UC session can be shared via the room display.

In another embodiment of the present invention there is provided a processing device comprising a processing unit, an operating system, a memory, and a beacon transmitter or receiver, the memory can comprise at least one pre-installed executable computer program product providing a communication protocol for communication between the processing device and a standard class of BYOD devices, the processing device can be configured to having the BYOD and the network device exchanging a beacon signal comprising the network device ID,
   generate and register an authentication-ID key,
   having the exchanged beacon signal triggering the BYOD app and the network device app to configure a data channel between them,
   having the configured data channel triggering the BYOD app to check if the BYOD UC client is connected to a UC session,
   if so, having the BYOD app sending an invitation comprising the authentication-ID key to the network device app instructing the UC client to connect to the UC session,
   having the network device app checking if at least one BYOD app that has a configured data channel to the network device app is also in the UC session,
   and if so, having the network device app accepting the invitation and instructing the network device UC client to connect to the UC session.

A computer program product can also be provided which when executed on a processing engine can perform any of the methods according to the present invention. A non-transitory storage means can be used to store the computer program product. The computer program product can be compiled for a processing engine in any of the electronic devices or is written in an interpretive language such as Java that runs on a virtual machine such as the Java virtual machine. The non-transitory signal storage medium can be for example, an optical disk (CD-ROM or DVD-ROM), a digital magnetic tape, a magnetic disk, a solid state memory such as a USB flash memory, a ROM, etc.

DEFINITIONS

Figure 1:
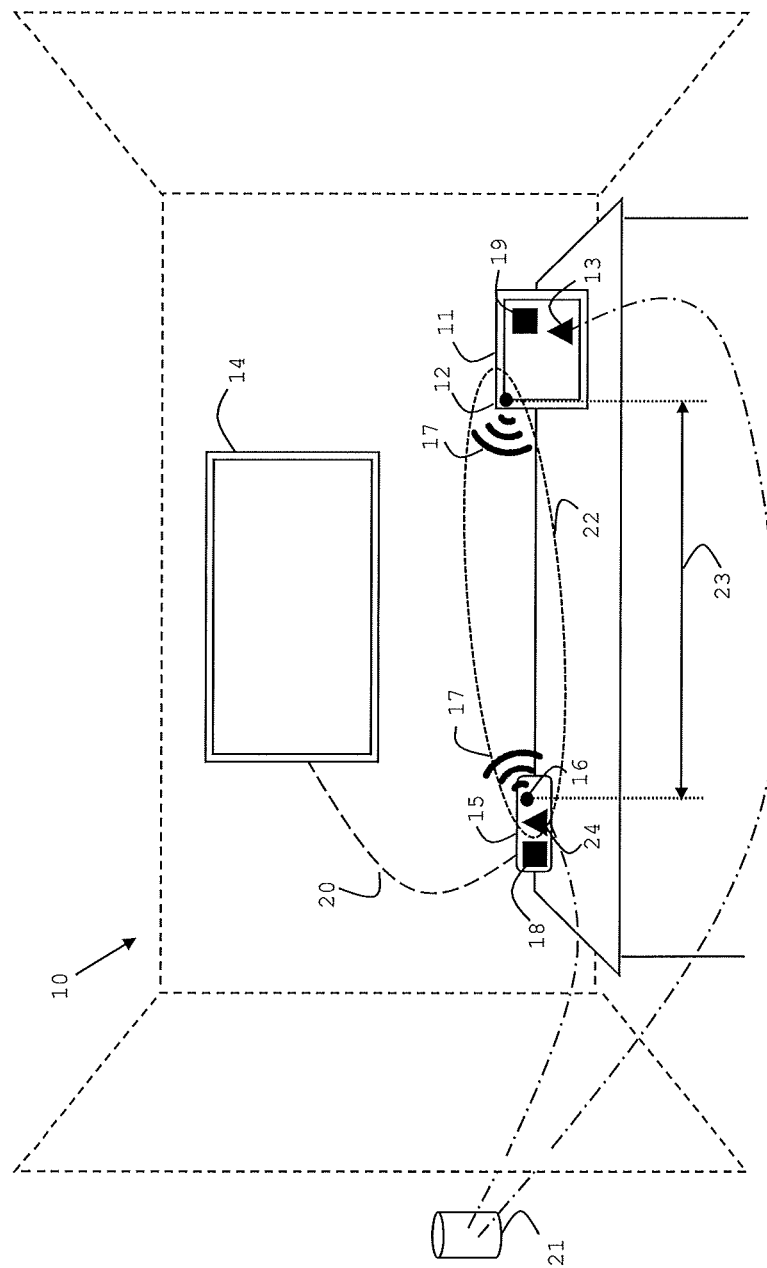
FIG. 1 illustrates an embodiment of the present invention comprising a BYOD and a network device located within the beacon system range.

A "BYOD" (Bring Your Own Device) can be computational processing devices comprising laptops, mobile phones, smartphones, tablets, palm pads and the like. In the present context it may also include a stationary computer. The computational processing device has means for providing content that can be outputted on an internal or external display device.

In accordance with the present invention the term "network device" relates to a network enabled digital processing device such as a Personal Computer (PC) or a work station having some form of display of information such as a display screen or one or more of a projector or other visible, audio or tactile displaying device. A network device has a processing engine, i.e. digital processor such as an FPGA or a microprocessor, having e.g. a Central Processing Unit (CPU) and/or a Graphical Processing Unit (GPU) and memory as well as interfaces such as a serial port or a network interface. A network device in operation is connected to a network, can access this network and use the facilities of the network as well as having local capabilities, applications, functions etc. For example, a network device in a meeting room can control access and manipulation of resources connected to it. Example of such resources can be displays, loudspeakers, microphones, furniture, lighting, temperature, etc. The network can be a shared resource network such as a Local Area network (LAN), Wide Area Network (WAN), Metropolitan Area Network (MAN), or a data network such as the Internet or can include combinations of these.

A network device as used with respect to the present invention generally does not relate to hardware that only mediates data in a computer network such as gateways, routers, bridges, switches, hubs, repeaters, multilayer switches, protocol converters, bridge routers, pure proxy servers, firewalls, network address translators, multiplexers, network interface controllers, wireless network interface controllers, modems, ISDN terminal adapters, line drivers, pure wireless access points, networking cables and other related hardware.

A network device can make use of a Network Access Device (or NAD) being an electronic circuit that automatically connects the network device to a network such as a preferred network. A NAD is any device that, when connected to, provides access to a larger communication network of some sort.

"Unified Communications system or tools" or UC refers to audio or audio visual communications such as provided by "Skype™" or "Skype™ for business". Such software can take over audio and/or visual data provided from a host processing device. Unified communication tool can be described as a collection of tools to do VOIP, (web) conferencing, shared whiteboarding, message exchange (e.g. chat), file transfer, or presence. Unified Communications system or tools can make use of a protocol- or standard defined or specific communication session or interaction, such as Voice-Over-Internet-Protocol ("VoIP"), text or instant messaging (e.g., AIM, Blauk, eBuddy, Gadu-Gadu, IBM Lotus Sametime, ICQ, iMessage, IMVU, Lync, MXit, Paltalk, Skype, Tencent QQ, Windows Live Messenger™ or MSN Messenger™, Wireclub, Xfire, and Yahoo! Messenger™ email, Twitter (e.g., tweeting), Digital Service Protocol (DSP), and the like. Unified Communications system or tools can make use of video conferencing cloud service including a video conferencing node to allow one or more users located at the first video conferencing endpoint to communicate with one or more users located at the second video conferencing endpoint in a video conference.

UC can be implemented as central computer program products on one or more remote servers connected with local computational devices. Local computational devices can comprise a local computer program product (a so-called client) that can access a central UC. Thus, a "UC session" can run on the remote server and be accessed by one or more local "UC clients" which can hereby exchange content. In the present context the term "UC" also comprises variants such as e.g. "Unified Communications & Collaboration (UC&C), Unified Communidations as a Service (UCaaS), Video conferencing solutions or similar solutions that allow audio and video communication both locally and remote.

A "beacon system" can comprise a beacon transmitter and a beacon receiver configured to send and receive a beacon signal. A beacon transmitter or transceiver is a device designed to attract attention to itself and/or its capabilities by means of sending wireless signals that can be read and parsed by any suitable transceiver or receiver within range or distance. Beacons can be low power transmitters that and unlike full communication with a base unit or station, do not need to carry traffic data. For example, pilot signals can operate as beacons, such pilots only transmitting in the pilot channel of a wireless telecommunication system. A beacon can transmit and receive signalling information including access requests and grants. Some beacons can also transmit and receive traffic data. For example a video stream captured by a camera associated with a network device can be sent to a mobile device over the beacon channel, or by other means such as over a network via the at least one server. Hence, if the beacon is reserved for signalling only this transfer of traffic, i.e. video stream) would not go via the beacon but via another wireless channel.

In any of the embodiments of the present invention it is specifically disclosed by this paragraph that a beacon can be a means for short distance communication, for example Bluetooth, Bluetooth Low energy, Near Field Communication, Zigbee, Li-fi.

A simple means for short distance communication related to proximity detection can be implemented with a loudspeaker (beacon transmitter) and a microphone (beacon receiver). The exchanged audio signal can be referred to as a "warble".

The proximity—or beacon range of a beacon system can be expressed in a distance and such range may additionally be limited e.g. by the walls of a room.

A software application or "app" can be a computer program product which is configured to handle exchange of data between devices in a digital or computerized system.

An app can be located on a remote application server and accessed via local clients. Apps can execute dedicated tasks on computerized devices.

A BYOD app, a network device app or a UC client can adopt a "state" related to e.g. connection—or sharing status. For example a BYOD app state or just BYOD state can be "not connected" to a network device, or it can be "connected" and "sharing UC content", etc. The present invention allows to synchronize the connectivity and sharing status between a device app and a UC client on either type of device. For example, if content is shared from a BYOD app, the app automatically triggers the BYOD UC client to share the same content in a UC session. Since a room display can be participant in the UC session (via the network device UC client) and share its content to all participants in the UC session, both those participants within the meeting room and remotely located participants can receive the shared content.

A "media data stream" comprises visual and/or audible content, for example images, recorded videos, real-life camera streams, documents, etc., that can be inspected on any display device in a collaboration platform. Additionally or alternatively, a data stream may contain audio data or meta data such as keyboard and mouse events.

A "room" is a space inside a structure or building, e.g. usually, a room is separated from both other rooms and the outside by walls and a ceiling. Each room usually has a specified purpose, in the present case a meeting room or conference room, defined by its use and the equipment therein to achieve this purpose. A room can have a 15 dB attenuation of wireless signals passing through the walls of the room.

DETAILED DESCRIPTION OF THE INVENTION

In the present context, a user is an operator or person using a BYOD. For convenience, the following text may use a "room display" as example of a room resource, but the present invention is not limited hereto but can comprise any resource that can be controlled by a network device such as e.g. loudspeakers, videocameras, microphones, lighting, thermostats, projector devices, electronic white boards, room furniture, etc.

FIG. 1 shows an embodiment of the present invention comprising a confined space or room 10. Inside the room 10 there is a BYOD 11 and a network device 15 which can control a room display 14. The network device 15 can be connected to the room display 14 via channel 20, which may be wireless or cabled. The BYOD 11 can comprise a beacon receiver 12 which can receive a beacon signal 17. Further the BYOD 11 can comprise a UC client 13 which can be connected to an active UC session on a UC server 21. The UC server 21 can be located elsewhere on a off-premise server (often "in the cloud").

The network device 15 can comprise a UC client 24 that can connect to a UC session at the UC server 21. The network device 15 can further comprise a beacon transmitter 16 which can transmit the beacon signal 17. The beacon transmitter 16 and beacon receiver 12 can be referred to as a beacon system 22 having a proximity range. The proximity range may be the largest value of the distance 23 that the transmitter and receiver can be separated and still exchange a signal. The largest value of the distance 23 may also be limited by the walls of a room. This can occur when the walls and ceiling of a room provide an attenuation of wireless signals such that the signal outside a room does not have sufficient energy for communications to be sustained. If a multiple of BYOD's are participating in the UC session (the BYOD's may be located within the room 14 or connecting remotely) it may be desirable to share the content of the UC session to the room display 14.

It may also be desirable to share the content of the room display 14 to all participating BYOD's. For example, if one participant is sharing to the room display 14 without using the UC session, it's advantageous if the all BYOD's can also receive that content. This may be implemented by making the network device 15, which the room display 14 is controlled by, participant of the UC session, so that content can be shared from the room display 14 to all participants, independent of the channel used to provide the content to the room display 14.

The present invention comprises a software application or "app" in the form of a network device app 18 and a BYOD app 19. The apps 18 and 19 can be configured to monitor and perform actions related to the exchange of data between the BYOD and the network device. The apps 18 and 19 can be configured so that certain data transfers can trigger the apps to perform an action. In this way the BYOD can receive necessary data for e.g. establishing a connection to a resource device, with limited need of input from the BYOD operator. The present invention can provide a user-centric approach where the environment can react to the presence of a BYOD and be configured to adapt hereto.

Figure 2:
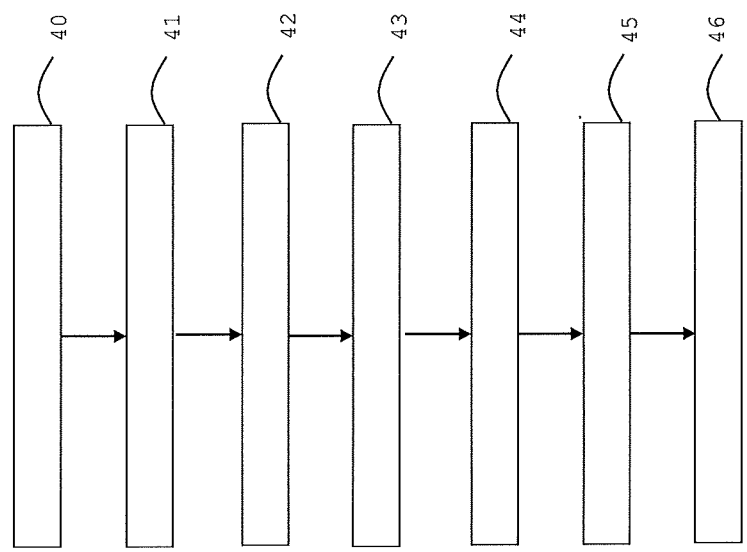
FIG. 2 shows a flow chart of an embodiment of the present invention.

FIG. 2 shows a flow chart of an embodiment of the present invention describing the event of how to automatically join a network device (and hereby a room resource) to a UC session.

In step 40 the BYOD 11 is brought into the meeting room 10. The beacon transmitter 16 can periodically or continuously send out a signal, for example a signal that cannot be perceived by human beings such as an ultrasound signal, e.g. a warble, a UV or infrared signal such as a diverse UV or infrared signal or an optical light signal which is modulated at such a high frequency that the human eye cannot detect it. The signal is broadcast within a room awaiting that a suitable receiver enters within the proximity or beacon range.

In step 41 the beacon system 22 detects that BYOD 11 and the network device 15 are located within the proximity or beacon range of the beacon system 22. The proximity detection (e.g. comprising that a beacon signal has been received by the beacon receiver) can trigger the BYOD app 19 to connect with the network device app 18. This step may be preceded by the BYOD app 19 receiving a confirmation to connect from the BYOD 11, e.g. the user of the BYOD 11 may be requested to confirm that he/she wants to connect to the network device 15. The event of connecting the BYOD app 19 with the network device app 18, can trigger the BYOD app 19 to check if there's an active UC session connected to the BYOD UC client 13 (step 43). If an active UC session is confirmed, the BYOD app 19 can send an invitation to the network device UC client 24 to join the UC session (step 44). In step 45, the network device app 18 can check for each BYOD connected to it if at least one of the connected BYOD also have a UC client connected to the UC session. (If a UC session has no BYOD's in a room, there is no use connecting the room display or other room resource to the UC session.) If this is confirmed, the network device app 18 accepts the invitation to join the UC session (step 46). With the procedure described in FIG. 2, the room display 14 can be made available as participant so that any content displayed on it can be shared to all participants in the UC session. This is independent of how the content was provided to the room display 14.

It would be possible to have a local BYOD, which is not connected to the UC session, in the meeting room of a network device. The network device (and related room resources) could be connected to a UC session via a remote BYOD which is in the UC session. The local BYOD could connect locally to the room display (and other room resources) and hereby participate in the UC session without having a UC client.

Figure 3:
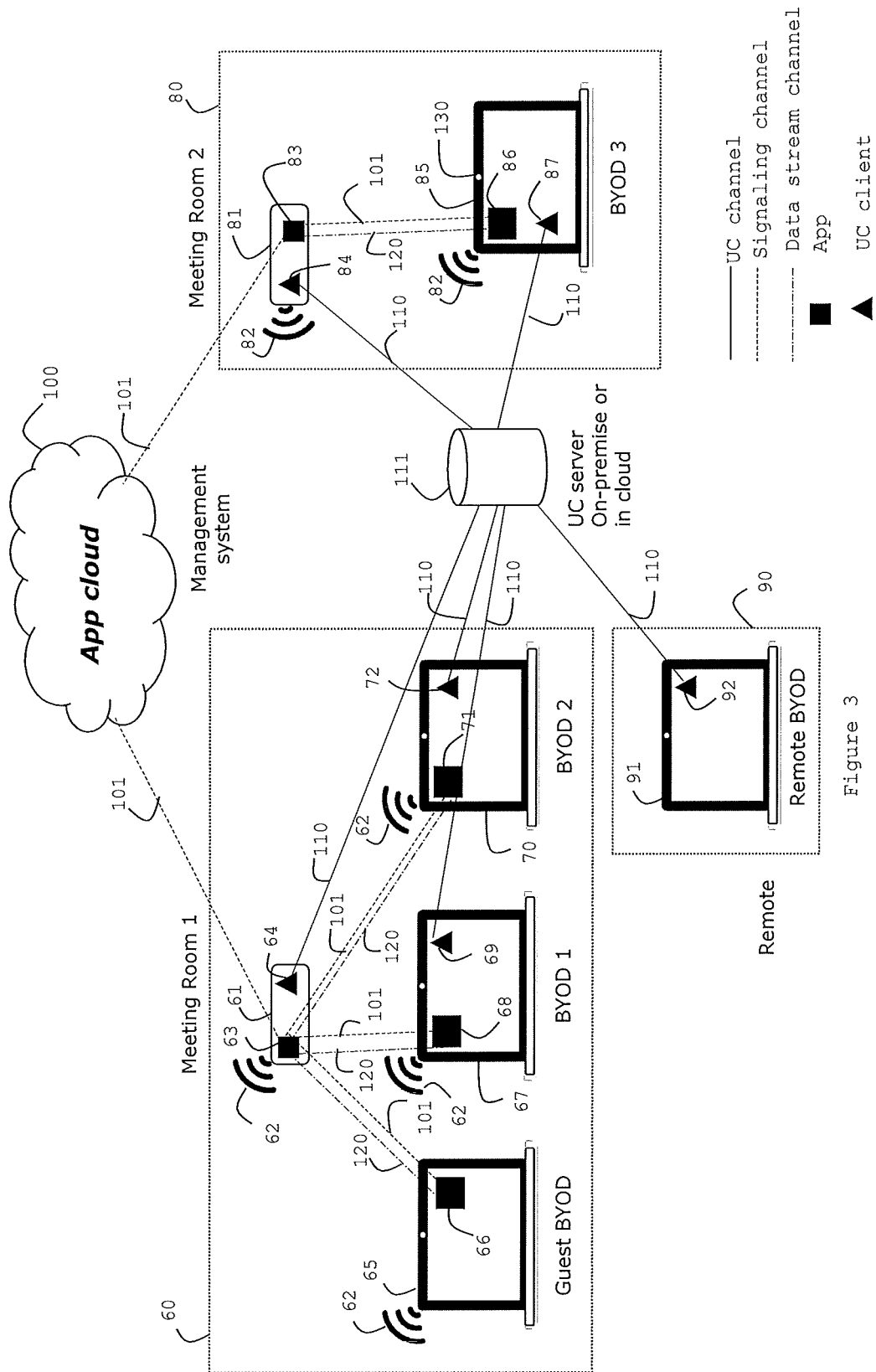
FIG. 3 illustrates an embodiment of the present invention comprising a multiple of BYOD's and network devices at different locations.

FIG. 3 shows an embodiment of the present invention comprising rooms 60 and 80 within the same premise and a remote room 90. All devices in FIG. 3 can transmit or receive a beacon signal and comprise a beacon transmitter or receiver respectively (c.f. FIG. 1), however the latter have been left out for clarity. The room 60 comprises a network device 61 which can transmit a beacon signal 62, and a network device app 63 and a UC client 64. The BYOD 65 can receive the beacon signal 62, and comprises a BYOD app 66. The BYODs 67, 70 can receive the beacon signal 62 and comprises a BYOD app 68, 71 and a UC client 69, 72, respectively. Room 80 comprises a network device 81, which can transmit a beacon signal 82, a network device app 83 and a UC client 84. The BYOD 85 can receive the beacon signal 82, and comprises a BYOD app 86 and aUC client 87. The remote room comprises a BYOD 91 which in turn comprises aUC client 92. All device apps 63, 66, 68, 71, 83 and 86 communicates with one or more servers hosting the application cloud 100 via a signaling channel 101, which can comprise a LAN, Wireless or any similar network. Each UC client can connect to a UC session (not shown) on the UC server, and communicates with a UC server 111 via a UC channel 110, which can comprise LAN, Wireless or any similar network. Content, such as media data streams, can be shared among the BYODs via a data stream channel 120 which can comprise LAN, Wireless or any similar network.

Figure 4:
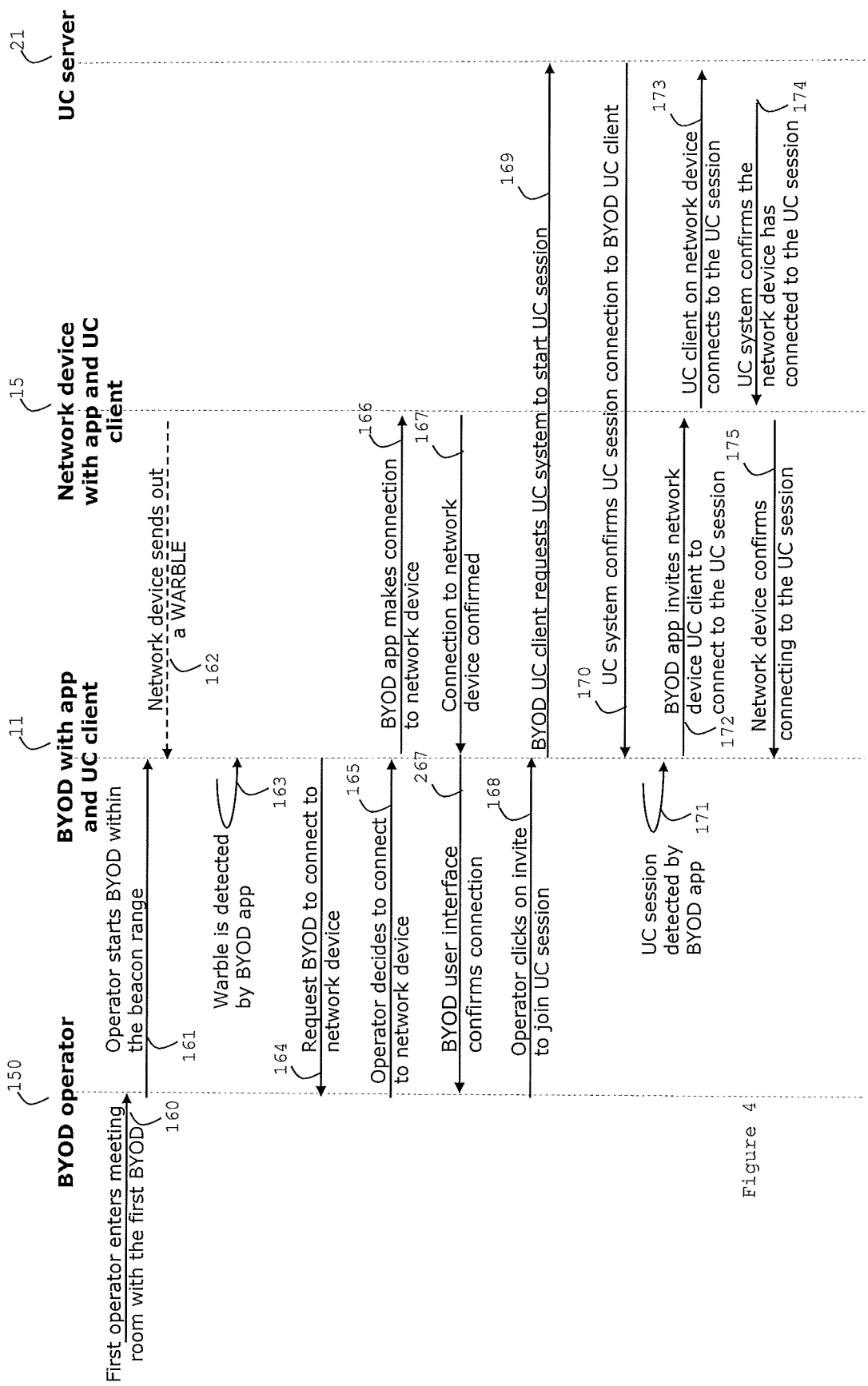
FIG. 4 shows a detailed flow chart of an embodiment of the present invention.

FIG. 4 shows a flow chart of an exemplary embodiment of the present invention comprising the different actions carried out by a BYOD operator 150, the BYOD 11 (from FIG. 1), the network device 15 (from FIG. 1) and a UC server 21 during a connection scenario. For this case there is not yet any other BYOD connected to the network device 15. While the flow chart in FIG. 2 gives an overview, the present flow chart emphasizes the interaction between the different devices.

The BYOD 11 and the network device 15 each comprises a beacon system 22 and an app 19 and 18 respectively. The operator 150 and the BYOD 11 enters the room or location where the network device 15 is located, and turns on the BYOD 11. The beacon systems sends out periodically or continuously a beacon signal, for example a signal that cannot be perceived by human beings such as an ultrasound signal, e.g. a warble, a UV or infrared signal such as a diverse UV or infrared signal or an optical light signal which is modulated at such a high frequency that the human eye cannot detect it. In the present scenario, the beacon system can comprise a loudspeaker on the network device 15 for periodically sending out a sound signal such as an ultrasound signal e.g. a warble 162 which can be detected by the BYOD 11 via its app in step 163.

Alternatively there can be a second beacon system for proximity detection present which can detect that BYOD devices are located within its beacon range and trigger the network device to send out a warble with connection details (using the first beacon system). The warble could then be transmitted e.g. during a limited amount of time, or until all BYODs within the range of the proximity beacon system have connected to the network device. This solution provides the possibility to not continuously transmit the warble.

The BYOD 11 displays an invitation to the operator 150 to confirm that the BYOD 11 should be connected to the network device 15. The operator 150 confirms the BYOD 11 should be connected (step 165). The BYOD app connects to the network device 15 (step 166), the network device 15 confirms the connection (step 167). The user interface communicates the confirmed connection (step 267). The operator 150 clicks on a UC call (or session) invitation displayed on the BYOD 11, and the UC client requests the UC server 21 to start a UC session (step 169), and the UC server 21 confirms the UC client of the BYOD 11 is connected to the UC session (step 170). The app of the BYOD 11 detects the active UC session (step 171), and this triggers the app of the BYOD 11 to invite the network device UC client to the connect to the UC session (step 172). The UC client of the network device 15 request to the UC server 21 to connect to the UC session (step 173), and the UC server 21 confirms the request (step 174) and the the network device 15 connects to the UC session (step 175).

Figure 5:
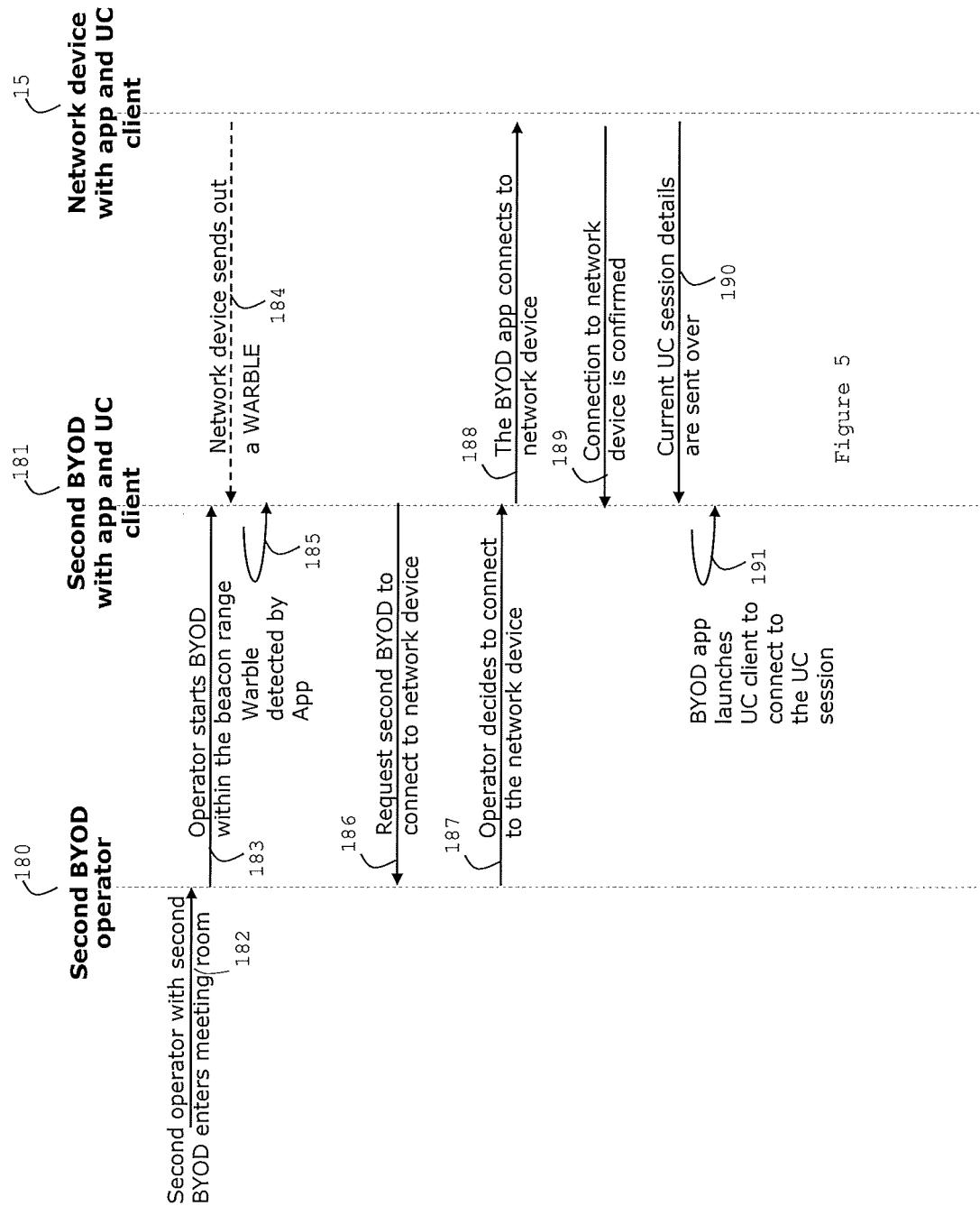
FIG. 5 shows a detailed flow chart of an embodiment of the present invention.

Once (the UC client of) the network device 15 is connected to the UC session, further BYODs can connect directly to the network device 15 via their UC clients. FIG. 5 illustrates an exemplary scenario hereof comprising a second operator 180 of a second BYOD 181, and the same network device 15. The second BYOD 181 and the network device 15 each comprises the same type of beacon system as in the scenario of FIG. 4, and the second BYOD comprises a BYOD app.

The second operator 180 and the second BYOD 181 enters the room or location where the network device 15 and the BYOD 11 are located (step 182), and turns on the second BYOD 181 (step 183). The app detects the warble 184 of the beacon system (step 185). The second BYOD 181 displays an invitation to the operator 180 to get confirmed that the second BYOD 181 should be connected to the network device 15 (step 186). The operator 180 confirms the second BYOD 181 should be connected (step 187). The BYOD app connects to the network device 15 (step 188), the network device 15 confirms the connection (step 189). The network device 15 sends the UC session details to the second BYOD app (step 190), which starts the BYOD UC client (step 191) and connects to the UC session.

| Part I: detecting presence and establishing a connection | |
| --- | --- |
| The BYOD, a device with an application running on, is being used to detect the current meeting room | The network device, a device being used to identify the current meeting room |
| If presence signal detected then<br>  Validate the signal<br>  Decrypt the signal<br>  Extract network device identification details<br>  Request authentication with the network device for a BYOD with given identity<br>End if<br>  If authentication code detected then<br>  Decrypt authentication code<br>  Send connection request to network device with authentication-identity pair<br>End if<br>If connection request confirmation received then<br>  Set current BYOD state to connected<br>End if | Do - every x clock ticks or when triggered by an event<br>  Send an identification signal<br>End Do<br>If authentication request received then<br>  Generate authentication code for given identity<br>  Store authentication code-identity pair<br>  Send the authentication code to the requesting BYOD<br>End if<br>If connection request received then<br>  Retrieve authentication code for given identity pair from authentication-identity list<br>  Validate authentication-identity pair<br>  Confirm connection request<br>End if |

| Part II: automated invitation of the network device in the UC session |
| --- |
| If UC is being detected then<br>  If BYOD is connected to network device then<br>    // Invite network device into detected UC session<br>    Retrieve network device identity from stored connection details<br>    Request UC application to add identity (whether BYOD or network device) to UC session<br>  End if<br>End If |

| Part III: automated acceptance and authentication of an ongoing UC session by the network device |
| --- |
| If network device is being invited into UC session then<br>  // Validate whether one of the BYODs is in the meeting room<br>  Retrieve identity details of BYODs in UC session<br>  Set approveInvitation to false<br>  For each identity in UC session<br>    If identity is found in connected identity list then<br>      Set approveInvitation to true<br>    End if<br>  End for<br>  If approveInvitation is true then<br>    Allow UC application to accept invitation<br>  End if<br>End If |

Figure 6:
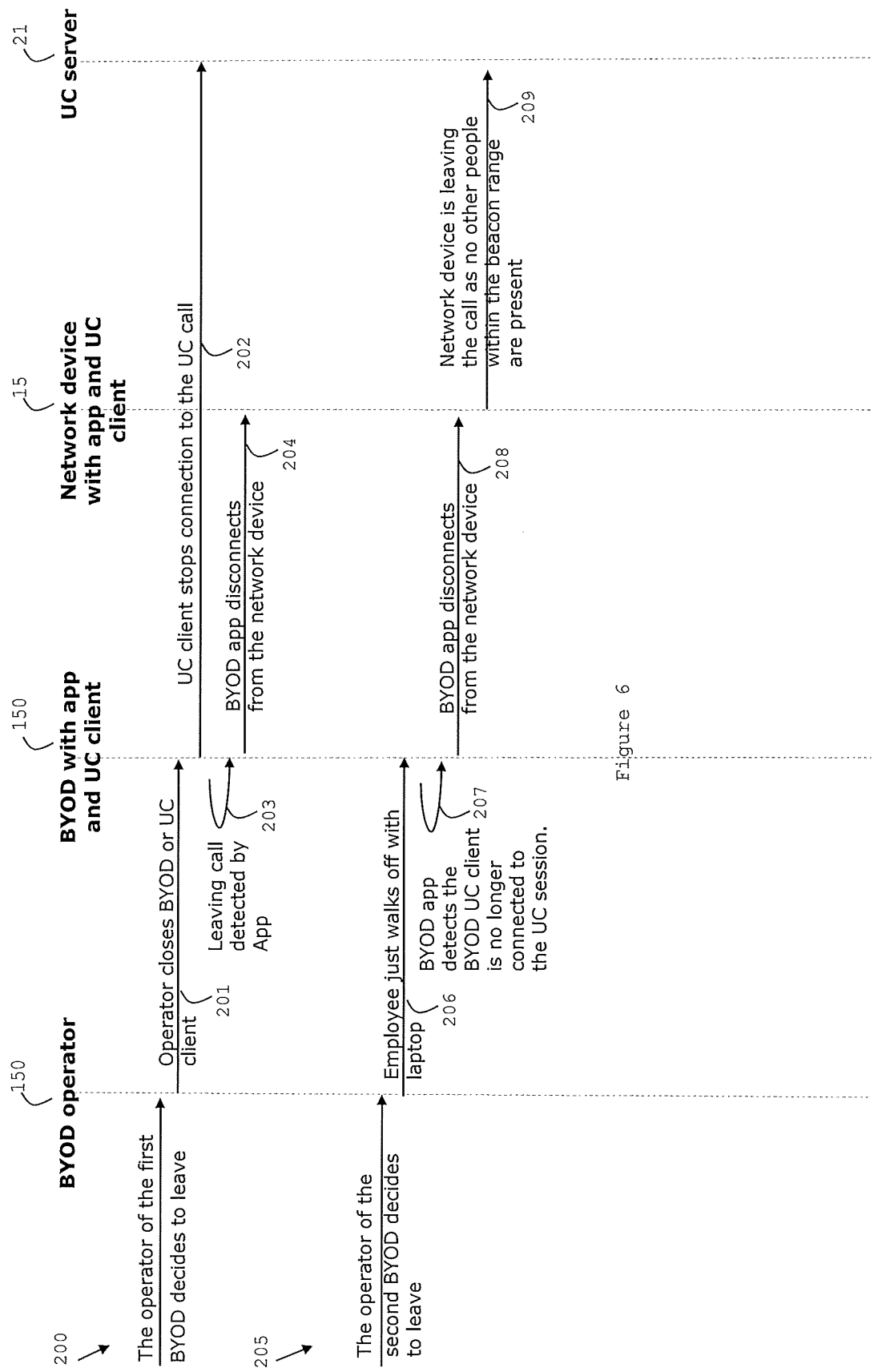
FIG. 6 shows a flow chart of an embodiment of the present invention comprising a BYOD leaving a UC session.

FIG. 6 shows flow charts 200 and 205 of embodiments of the present invention where the UC client of a BYOD is initially connected to a UC session and the BYOD is connected to a network device and where the BYOD disconnects from the UC session or disconnects from the network device.

The flow chart 200 illustrates a scenario when one BYOD leaves the beacon range so that the connection to the network device is broken, or closes the connection to the UC session (step 201), but there is still another BYOD within the beacon range connected to the network device. The UC client stops accessing the UC session (step 202). The stopped call is detected by the BYOD app (203) and the BYOD app disconnects the BYOD from the network device (204).

The flow chart 205 illustrates a scenario when the last BYOD within the beacon range moves out of the beacon range. The BYOD app detects that the BYOD is no longer within the range (step 207). The BYOD app disconnects the BYOD from the network device (step 208) and the network device UC client disconnects from the UC session (step 209).

Figure 7:
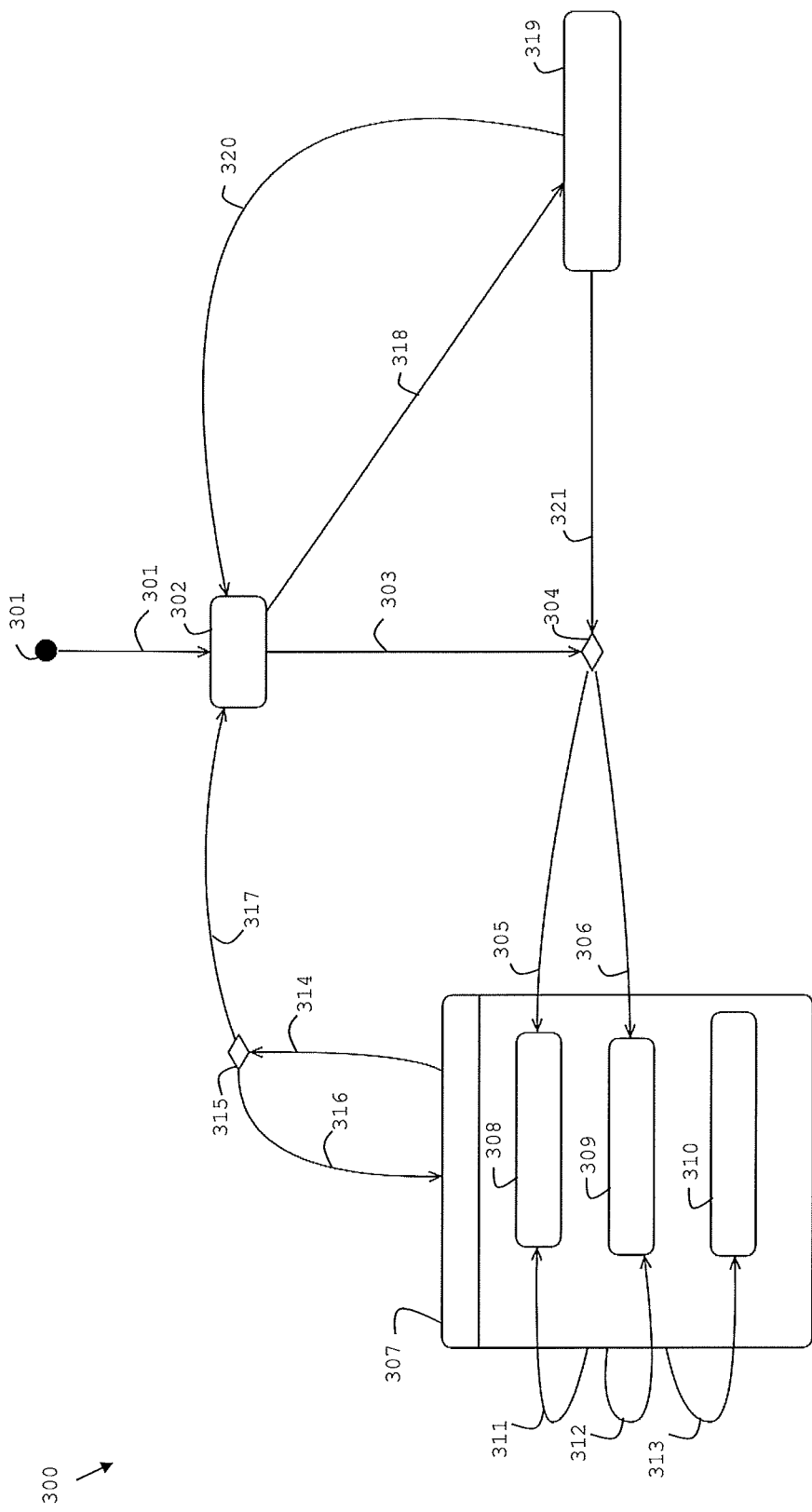
FIG. 7 shows a state diagram for a network device.
Figure 8:
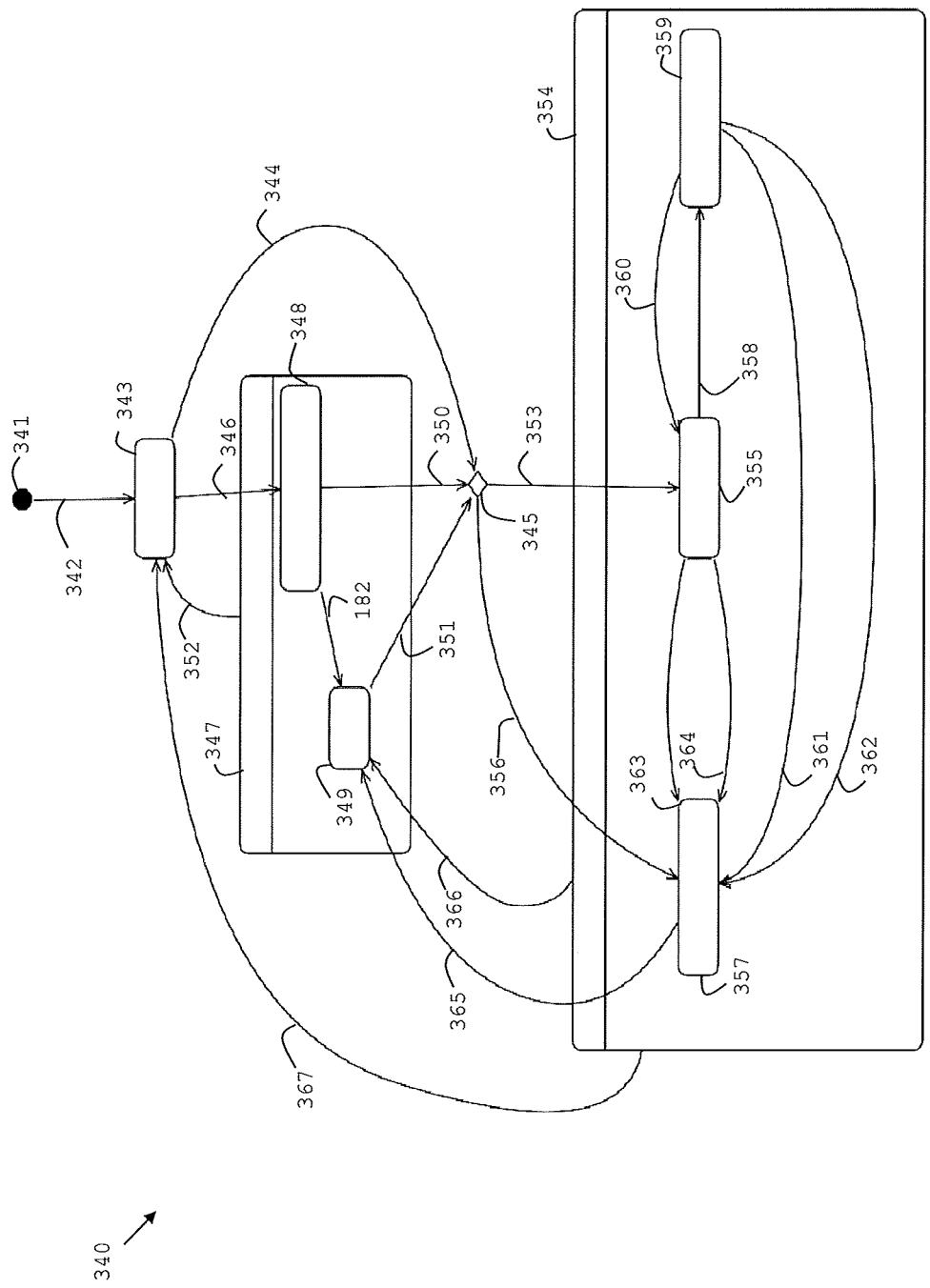
FIG. 8 shows a state diagram for a BYOD having a UC client.
Figure 9:
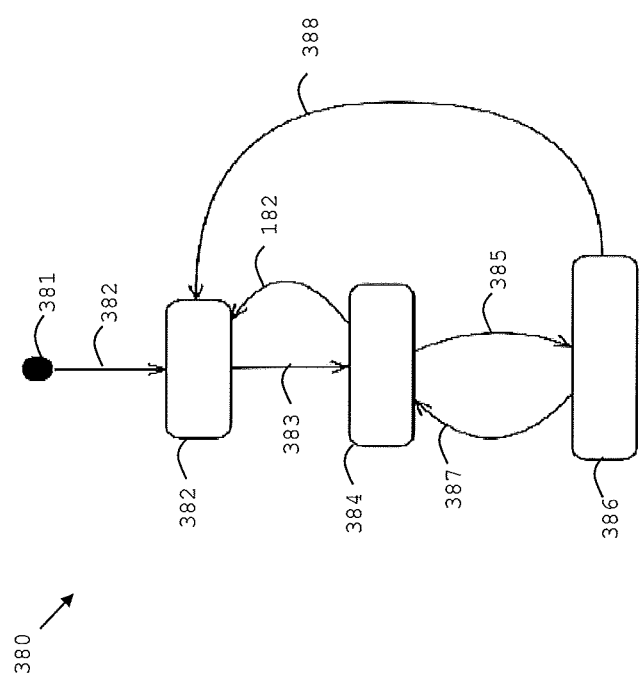
FIG. 9 shows a state diagram for a BYOD having no UC client.

FIGS. 7 to 9 show state diagrams of embodiments of the present invention. In each state diagram, the black dot is the start point and each arrow is an event. A rectangular block represents the state of the device after an event; several events can lead to the same state. A diamond symbol represents a point of choice where several events can be possible, often depending on the environmental conditions.

In the text describing FIGS. 7 to 9, the simplified expression "join a UC session" will be used for a BYOD or a network device. This can comprise (as described in FIG. 4 and related text):
the BYOD and the network device connect to each other, if they are not already connected, and/or
the BYOD UC client and/or the network device clients are activated and access a UC session (running on a UC server).

A BYOD or a network device can "leave a UC session" by no longer accessing the UC session.

Further, the "beacon range" is the range of the beacon system, described in FIG. 1 and related text. "Local content" is shared by means other than via the UC session. "UC content" is shared within the UC session.

The state diagram 300 in FIG. 7 shows possible states for a network device. At starting point 301 the network device app is started or activated 301 and goes to "ready" 302. In event 303, a BYOD can "join a UC session" when it is located within the "beacon range" of the beacon system. Alternatively, the BYOD has already joined a UC session and then enters the "beacon range" of the beacon system. Event 303 ends with a point of choice 304, comprising the possibility of the BYOD to not share content 305 or to share content 306. Both 305 and 306 leads to state 307 where the network device is connected to a UC session. State 307 comprises the sub-states of UC content "not shared" 308 or "shared" 309. Additionally or alternatively, the BYOD can share "local content" 310 to the network device. Within state 307 there can be a change between sub-states 308 to 310, for example via 311 where the BYOD stops sharing local content or UC content, or via 312 where the BYOD shares UC content via the UC session, or via 313 where the BYOD shares local content. From state 307, the BYOD can leave the beacon range or "leave the UC session" 314 to end up in a point of choice 315. If there is still a BYOD located within the meeting room 316, the network device will remain in the UC session and state 307. If there is no more BYOD located within the meeting room 317, the network device UC client disconnects from the UC session and returns to "ready" 302. If a BYOD is located within the meeting room and connected with the network device, which is in state "ready" 302, the BYOD can share local content 318 to the network device, which adopts the state "content shared locally" 319. If a connected BYOD stops sharing locally, or leaves the beacon range 320, the network device returns to "ready" 302. Of a connected BYOD starts a call when located within the beacon range, or brings a call into the beacon range 321, the network device goes to the point of choice 304, described above.

The state diagram 340 in FIG. 8 shows possible states for a BYOD. At starting point 341 the BYOD is located outside a beacon range related to a network device. The BYOD app is started 342 and the BYOD adopts the state "not in meeting room" 343. The BYOD can now be connected to the network device manually 344 and arriving at a point of choice 345. Alternatively, the BYOD can enter within the beacon range 346 and adopt a "detected" state 347. The BYOD can now be offered to connect to the network device and adopt sub-state "connection offered" 348. The BYOD may ignore the offer and adopt sub-state "ignore" 349, or the BYOD can accept the connection 350 and arrive at the point of choice 345. From the state "ignore" 349 it is also possible for the BYOD to request a connection 351 in order to arrive at the point of choice 345. The BYOD can leave 352 the detected state 347 and arrive at the state "not in meeting room" 343. The point of choice 345 may comprise "no ongoing UC session" 353 whereby the BYOD will adopt the state of "connected" 354 and its substrate "not sharing" 355. Alternatively, there can already be an ongoing call that the BYOD joins 356 whereby the BYOD adopts the connected state 354 and its sub-state "shared UC session" 357. From the "not sharing" 355, the BYOD can share locally 358 and adopt "sharing locally" 359 and again stop sharing 360 and return to "not sharing" 355. Alternatively, the BYOD can adopt the state of "shared UC session" 357 by starting from "sharing locally" 359 and start or join a UC session 361, whereby the UC sharing can be given priority over local sharing so that the local sharing is stopped. Alternatively, starting from the BYOD "sharing locally" 359, the network device can stop the local sharing from the BYOD and join a UC session 362 so that the content from the BYOD can now be shared via the UC session. Further, from the "not sharing" 355, the BYOD can start a UC session or join an ongoing UC call (or session) and adopt "shared UC session" 357. Alternatively, the network device can join an ongoing UC session 364 and adopt "shared UC session" 357. From the "shared UC session" 357, the BYOD can leave the UC session 365 and return to "ignore" 349. From any of the "connected" 354 states, the the BYOD can disconnect 366 from the network device and return to "ignore" 349 or the BYOD can be brought out of the beacon range 367 and return to the state "not in meeting room" 343.

The state diagram 380 in FIG. 9 shows possible states for a BYOD which does not have a UC client installed. At starting point 381 the BYOD is located outside a beacon range related to a network device. The BYOD app is started 382 and the BYOD goes to state "not in meeting room" 382. The BYOD can now be brought into the beacon range 383 and adopt the state "not sharing" 384. If the BYOD leaves the beacon range, it will return to "not in meeting room" 382. Alternatively, if the BYOD shares content locally 385 to the network device (which is not in a UC session) it can adopt the state "sharing locally" 386. The BYOD can now stop sharing 387 (and another BYOD can start sharing) so it returns to the "not sharing" 384. Alternatively, starting from "sharing locally" 386, the BYOD can be brought out of the beacon range 388 and return to "not in meeting room" 382.

Electronic devices e.g. network devices such as described with respect to embodiments of the present invention can be standalone digital processing devices or can be embedded in another device. Such devices or methods can use a digital processing engine to carry out functions. The processing engine preferably has processing capability such as provided by one or more microprocessors, FPGA's, or a central processing unit (CPU) and/or a Graphics Processing Unit (GPU), and is adapted to carry out the respective functions by being programmed with software, i.e. one or more computer programs. References to software can encompass any type of programs in any language executable directly or indirectly by a processor, either via a compiled or interpretative language such as Java. The implementation of any of the methods of the present invention can be performed by or assisted by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

Such devices may have memory (such as non-volatile memory, non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any of the networks. The software can be embodied in a computer program product adapted to carry out the functions itemised below when the software is loaded onto the controller and executed on one or more processing engines such as microprocessors, ASIC's, FPGA's etc. devices for use with any of the embodiments of the present invention can incorporate a computer system capable of running one or more computer applications in the form of computer software.

When the software is loaded onto the respective device or devices and executed on one or more processing engines such as microprocessors, ASIC's, FPGA's methods of embodiments of the present invention can be performed by one or more computer programs running on an electronic device by being loaded into a memory and run on or in association with an operating system such as Windows' supplied by Microsoft Corp, USA, Linux, Android or similar. The electronic device can include a main memory, preferably random access memory (RAM), and may also include a non-transitory hard disk drive and/or a removable non-transitory memory, and/or a non-transitory solid state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

When the software is loaded onto the respective device or devices and executed on one or more processing engines such as microprocessors, ASIC's, FPGA's the following functions are carried out:
    joining a network device having a UC client to a UC session connected to at least one BYOD having a BYOD UC client.

When the software is loaded onto the respective device or devices and executed on one or more processing engines such as microprocessors, ASIC's, FPGA's the following functions are carried out:
    the network device and the BYOD can each comprise a beacon transmitter configured to a beacon receiver configured to receive the beacon signal within its range, so that they can exchange the beacon signal,
    the network device comprising an ID, a network device application (app) and the UC client, and the BYOD comprising a BYOD app and the BYOD UC client.

When the software is loaded onto the respective device or devices and executed on one or more processing engines such as microprocessors, ASIC's, FPGA's the following functions are carried out:
    bringing the BYOD and the network device within the beacon signal range so that the BYOD and the network device exchange a beacon signal comprising the network device ID,
    generating and registering an authentication-ID key,
    the exchanged beacon signal triggering the BYOD app and the network device app to configure a data channel between them,
    the configured data channel triggering the BYOD app to check if the BYOD UC client is connected to a UC session,
    if so, the BYOD app sending an invitation comprising the authentication-ID key to the network device app instructing the UC client to connect to the UC session,
    the network device app checking if at least one BYOD app that has a configured data channel to the network device app is also in the UC session,
    if so, the network device app accepting the invitation and instructing the network device UC client to connect to the UC session.

When the software is loaded onto the respective device or devices and executed on one or more processing engines such as microprocessors, ASIC's, FPGA's the following functions are carried out:
    for a second BYOD, the network device and the second BYOD each comprising a beacon transmitter configured to periodically or continuously transmit a beacon signal, the beacon signal having a range, or a beacon receiver configured to receive the beacon signal within its range, so that they can exchange the beacon signal, the beacon signal having a range, the second BYOD comprises a second BYOD app and a second BYOD UC client.

When the software is loaded onto the respective device or devices and executed on one or more processing engines such as microprocessors, ASIC's, FPGA's the following functions are carried out:
    bringing the second BYOD and the network device within the beacon signal range so that the second BYOD and the network device can exchange a beacon signal,
    the exchanged beacon signal triggering the second BYOD app and the network device app to configure a data channel between them,
    the configured data channel triggering the second BYOD app to check if the network device UC client is connected to a UC session,
    if so, the second BYOD app instructing the second UC client to connect to the UC session.

When the software is loaded onto the respective device or devices and executed on one or more processing engines such as microprocessors, ASIC's, FPGA's the following functions are carried out:
    the network device and the BYOD can comprise a second beacon system having a range for proximity detection and comprising a beacon transmitter configured to periodically or continuously transmit a beacon signal, the method comprising bringing the network device and the BYOD within the range for proximity detection, the second beacon system exchanging a beacon signal, which triggers the transmitter of the first beacon system to periodically or continuously send out a beacon signal during a limited amount of time or until a data channel has been configured between the network device and the BYOD.

When the software is loaded onto the respective device or devices and executed on one or more processing engines such as microprocessors, ASIC's, FPGA's the following functions are carried out:
registering a data channel between the BYOD and the network device which is preceded by the BYOD confirming to connect with the network device;
when the BYOD comprises a BYOD identity, further comprising registering a data channel, the method comprising the BYOD app requesting authentication with the network device app for the BYOD identity,
alternatively, registering a data channel, the method comprising the network device app generating and registering an authentication code with the BYOD identity.

When the software is loaded onto the respective device or devices and executed on one or more processing engines such as microprocessors, ASIC's, FPGA's the following functions are carried out:
when the network device is connected to a room resource having input and output signals, the network device app controlling the input and output signals of the room resource,
the BYOD app adopts a BYOD app state and the BYOD UC client adopts a BYOD UC client state, the method comprising the step of the BYOD app bringing the BYOD UC client state equal to the BYOD app state.

When the software is loaded onto the respective device or devices and executed on one or more processing engines such as microprocessors, ASIC's, FPGA's the following functions are carried out:
is provided having a BYOD app and no BYOD UC client, and when the network device is being connected to a UC session, a BYOD app of another BYOD of a third type sharing content to the network device app, the network device app sharing the content to the network device UC client which then shares the content in the UC session.

Summarising the above, the present invention in first aspect provides a method for joining a network device having a UC client to a UC session connected to at least one BYOD having a BYOD UC client,
the network device and the BYOD each comprising a beacon transmitter configured to a beacon receiver configured to receive the beacon signal within its range, so that they can exchange the beacon signal,
the network device comprising an ID, a network device application (app) and the UC client, and the BYOD comprising a BYOD app and the BYOD UC client, the method comprising the steps of
bringing the BYOD and the network device within the beacon signal range so that the BYOD and the network device exchange a beacon signal comprising the network device ID,
generating and registering an authentication-ID key,
the exchanged beacon signal triggering the BYOD app and the network device app to configure a data channel between them,
the configured data channel triggering the BYOD app to check if the BYOD UC client is connected to a UC session,
if so, the BYOD app sending an invitation comprising the authentication-ID key to the network device app instructing the UC client to connect to the UC session,
the network device app checking if at least one BYOD app that has a configured data channel to the network device app is also in the UC session,
if so, the network device app accepting the invitation and instructing the network device UC client to connect to the UC session.

The first aspect may include a second aspect being a second BYOD, the network device and the second BYOD each comprising a beacon transmitter configured to periodically or continuously transmit a beacon signal, the beacon signal having a range, or a beacon receiver configured to receive the beacon signal within its range, so that they can exchange the beacon signal, the beacon signal having a range,
the second BYOD comprises a second BYOD app and a second BYOD UC client, the method further comprising the steps of
bringing the second BYOD and the network device within the beacon signal range so that the second BYOD and the network device can exchange a beacon signal,
the exchanged beacon signal triggering the second BYOD app and the network device app to configure a data channel between them,
the configured data channel triggering the second BYOD app to check if the network device UC client is connected to a UC session,
if so, the second BYOD app instructing the second UC client to connect to the UC session.

Either the first or second aspect can include a third aspect wherein the network device and the BYOD comprise a second beacon system having a range for proximity detection and comprising a beacon transmitter configured to periodically or continuously transmit a beacon signal, the method comprising bringing the network device and the BYOD within the range for proximity detection, the second beacon system exchanging a beacon signal, which triggers the transmitter of the first beacon system to periodically or continuously send out a beacon signal during a limited amount of time or until a data channel has been configured between the network device and the BYOD.

A fourth aspect that can include any combination of the first to third aspects can comprise a step of registering a data channel between the BYOD and the network device which is preceded by the BYOD confirming to connect with the network device.

A fifth aspect that can include any combination of the first to fourth aspects can comprise a step of registering a data channel between the BYOD and the network device which is preceded by the BYOD confirming to connect with the network device.

In a sixth aspect that can include any combination of the first to fifth aspects the BYOD comprises a BYOD identity, and further comprises a step of registering a data channel, the method comprising the BYOD app requesting authentication with the network device app for the BYOD identity.

A seventh aspect that can include any combination of the first to sixth aspects comprises a step of registering a data channel between the BYOD and the network device which is preceded by the BYOD confirming to connect with the network device.

An eighth aspect that can include any combination of the first to seventh aspects can comprise a step of registering a data channel, the method comprising the network device app generating and registering an authentication code with the BYOD identity.

A ninth aspect that can include any combination of the first to seventh aspects comprises a step of registering a data channel between the BYOD and the network device which is preceded by the BYOD confirming to connect with the network device.

In a tenth aspect that can include any combination of the first to ninth aspects the network device can be connected to a room resource having input and output signals, and the method comprising the step of the network device app controlling the input and output signals of the room resource.

An eleventh aspect that can include any combination of the first to tenth aspects comprises a step of registering a data channel between the BYOD and the network device which is preceded by the BYOD confirming to connect with the network device.

In twelfth aspect that can include any combination of the first to eleventh aspects the BYOD app adopts a BYOD app state and the BYOD UC client adopts a BYOD UC client state, the method comprising the step of the BYOD app bringing the BYOD UC client state equal to the BYOD app state.

A thirteenth aspect that can include any combination of the first to eighth aspects comprises a step of registering a data channel between the BYOD and the network device which is preceded by the BYOD confirming to connect with the network device.

An fourteenth aspect that can include any combination of the first to seventh aspects can comprise another BYOD of a third type having a BYOD app and no BYOD UC client, the method comprising when the network device is being connected to a UC session, the BYOD app of the another BYOD of the third type sharing content to the network device app, the network device app sharing the content to the network device UC client which then shares the content in the UC session.

A fifteenth aspect comprises a system for joining a network device having a UC client to a UC session connected to at least one BYOD having a UC client,
  the network device and the BYOD each having a beacon transmitter configured to a beacon receiver configured to receive the beacon signal within its range, so that they can exchange the beacon signal,
  the network device comprising an ID, a network device app and the UC client, and the BYOD comprising a BYOD app and the BYOD UC client,
  if the BYOD and the network device are positioned within the beacon signal range, there is an exchange of a beacon signal between the network device and the BYOD, wherein the beacon signal comprises a network device ID and a corresponding authentication-ID for authorizing the BYOD UC client to connect to the UC session.

In a sixteenth aspect a second BYOD, the network device and the second BYOD each comprise a beacon transmitter configured to periodically or continuously transmit a beacon signal, the beacon signal having a range, or a beacon receiver configured to receive the beacon signal within its range, so that they can exchange the beacon signal,
  the second BYOD comprising a second BYOD app and a second UC client,
  the system is configured to:
  bringing the second BYOD and the network device within the beacon signal range so that the second BYOD and the network device can exchange a beacon signal,
  the exchanged beacon signal triggering the second BYOD app and the network device app to configure a data channel between them,
  the configured data channel triggering the second BYOD app to check if the network device UC client is connected to a UC session, if so, the second BYOD app instructing the second UC client to connect to the UC session.

In a seventeenth aspect that depends on the sixteenth aspect the network device and the BYOD comprise a second beacon system having a range for proximity detection and comprising a beacon transmitter configured to periodically or continuously transmit a beacon signal, the method comprising bringing the network device and the BYOD within the range for proximity detection, the second beacon system exchanging a beacon signal, which triggers the transmitter of the first beacon system to periodically or continuously send out a beacon signal during a limited amount of time or until a data channel has been configured between the network device and the BYOD.

An eighteenth aspect that depends on any of the sixteenth and seventeenth aspects comprises a BYOD confirmation to connect to the network device and a registered data channel between the BYOD and the network device.

A nineteenth aspect that depends on any of the sixteenth, seventeenth, and eighteenth aspects comprises where the BYOD comprises an BYOD identity, and wherein the system comprises a registered data channel and a BYOD app request for authentication of the BYOD identity with the network device app.

A twentieth aspect that depends on any of the sixteenth, seventeenth, eighteenth and nineteenth aspects comprises further comprising a registered data channel and wherein the network device app comprises an authentication code with the BYOD identity.

In a twenty-first aspect that depends on any of the sixteenth to twentieth aspects the network device is connected to a room resource having input and output signals which are controlled by the network device.

In a twenty-second aspect that depends on any of the sixteenth to twenty-first aspects the BYOD app has a BYOD app state and the BYOD UC client has a BYOD UC client state and the system being configured to have the BYOD app bringing the BYOD UC client state equal to the BYOD app state.

In a twenty-third aspect that depends on any of the sixteenth to twenty-second aspects comprises another BYOD of a third type having a BYOD app and no BYOD UC client, the network device is connected to a UC session, the BYOD app of the another BYOD of the third type shares content to the network device app, the network device app shares the content to the network device UC client which then shares the content in the UC session.

In another aspect a processing device is provided comprising a processing unit, an operating system, a memory, and a beacon transmitter or receiver, the memory comprising at least one pre-installed executable computer program product providing a communication protocol for communication between the processing device and a standard class of BYOD devices, the processing device being configured to
  having the BYOD and the network device exchanging a beacon signal comprising the network device ID,
  generating and registering an authentication-ID key,
  having the exchanged beacon signal triggering the BYOD app and the network device app to configure a data channel between them,
  having the configured data channel triggering the BYOD app to check if the BYOD UC client is connected to a UC session, if so, having the BYOD app sending an invitation comprising the authentication-ID key to the network device app instructing the UC client to connect to the UC session, having the network device app checking if at least one BYOD app that has a configured data channel to the network device app is also in the UC session, and if so, having the network device app accepting the invitation and instructing the network device UC client to connect to the UC session.

The invention claimed is:

1. A method for joining a network device to at least one bring your own device (BYOD), the network device and the BYOD each comprising a beacon transmitter configured to periodically or continuously transmit a beacon signal, the beacon signal having a range, or a beacon receiver configured to receive the beacon signal within its range, so that they can exchange the beacon signal, the network device comprising an identification (ID) and a network device application (app), and the BYOD comprising a BYOD app and a BYOD unified communications (UC) client, the method comprising the steps of:

bringing the BYOD and the network device within the beacon signal range so that the BYOD and the network device exchange a beacon signal comprising the network device ID, the exchanged beacon signal triggering the BYOD app and the network device app to configure a data channel between them, and when the channel is configured, the BYOD app adopts a BYOD app state and the BYOD UC client adopts a BYOD UC client state, further comprising the BYOD UC client state being brought equal to the BYOD app state.

2. The method according to claim 1, wherein the network device and the BYOD comprise a second beacon system having a range for proximity detection and comprising a beacon transmitter configured to periodically or continuously transmit a beacon signal, the method comprising bringing the network device and the BYOD within the range for proximity detection, the second beacon system exchanging a beacon signal, which triggers the transmitter of the first beacon system to periodically or continuously send out a beacon signal during a limited amount of time or until a data channel has been configured between the network device and the BYOD.

3. The method according to claim 1, further comprising a step of registering a data channel between the BYOD and the network device which is preceded by the BYOD confirming to connect with the network device.

4. The method according to claim 1, wherein the BYOD comprises a BYOD identity, further comprising a step of registering a data channel, the method comprising the BYOD app requesting authentication with the network device app for the BYOD identity.

5. The method according to claim 1, further comprising a step of registering a data channel, the method comprising the network device app generating and registering an authentication code with the BYOD identity.

6. The method according to claim 1, wherein the network device is connected to a room resource having input and output signals, and the method comprising the step of the network device app controlling the input and output signals of the room resource.

7. The method according to claim 1, wherein the BYOD app adopts a BYOD app state and the BYOD UC client adopts a BYOD UC client state, the method comprising the step of the BYOD app bringing the BYOD UC client state equal to the BYOD app state.

8. The method according to claim 1 wherein the bringing of the BYOD UC client state equal to the BYOD app state, refers to audio or audio visual communications.

9. A system for joining a network device to at least one bring your own device (BYOD), the network device and the BYOD each having a beacon transmitter configured to periodically or continuously transmit a beacon signal, the beacon signal having a range, or a beacon receiver configured to receive the beacon signal within its range, so that they can exchange the beacon signal, the network device comprising an identification (ID), and a network device application (app) and the BYOD comprising a BYOD app and a BYOD unified communications (UC) client, if the BYOD and the network device are positioned within the beacon signal range, there is an exchange of a beacon signal between the network device and the BYOD, wherein the beacon signal comprises a network device ID, the exchanged beacon signal triggering the second BYOD app and the network device app to configure a data channel between them, and when the channel is configured, the BYOD app adopts a BYOD app state and the BYOD UC client adopts a BYOD UC client state, further comprising the BYOD UC client state being brought equal to the BYOD app state.

10. The system according to claim 9, wherein the network device and the BYOD comprise a second beacon system having a range for proximity detection and comprising a beacon transmitter configured to periodically or continuously transmit a beacon signal, the system comprising bringing the network device and the BYOD within the range for proximity detection, the second beacon system exchanging a beacon signal, which triggers the transmitter of the first beacon system to periodically or continuously send out a beacon signal during a limited amount of time or until a data channel has been configured between the network device and the BYOD.

11. The system according to claim 9, further comprising a BYOD confirmation to connect to the network device and a registered data channel between the BYOD and the network device.

12. The system according to claim 9, wherein the BYOD comprises an BYOD identity, and wherein the system comprises a registered data channel and a BYOD app request for authentication of the BYOD identity with the network device app.

13. The system according to claim 9, further comprising a registered data channel and wherein the network device app comprises an authentication code with the BYOD identity.

14. The system according to claim 9, wherein the network device is connected to a room resource having input and output signals which are controlled by the network device app.

15. The system according to claim 9, wherein the BYOD app has a BYOD app state and the BYOD UC client has a BYOD UC client state and the system being configured to have the BYOD app bringing the BYOD UC client state equal to the BYOD app state.

16. The system according to claim 9 wherein the BYOD UC client state being brought equal to the BYOD app state, refers to audio or audio visual communications.

17. A processing device comprising a processing unit, an operating system, a memory, and a beacon transmitter or receiver, the memory comprising at least one pre-installed executable computer program product providing a communication protocol for communication between the processing device and a standard class of bring your own device (BYOD) devices, the processing device being configured to have a BYOD and a network device exchange a beacon signal comprising the network device identification (ID), when the BYOD and the network device are positioned within the beacon signal range, and having the exchanged beacon signal triggering a BYOD application (app) and a network device app to configure a data channel between them, and when the channel is configured, the BYOD app adopts a BYOD app state and a BYOD unified communications (UC) client adopts a BYOD UC client state, further comprising the BYOD UC client state being brought equal to the BYOD app state.

18. The processing device according to claim 17, wherein the BYOD UC client state being brought equal to the BYOD app state, refers to audio or audio visual communications.

19. A non-transitory computer program product which when executed on a processing engine performs a method according to claim 1.

* * * * *